Patented Sept. 25, 1951

2,569,423

UNITED STATES PATENT OFFICE 2,569,423

PROCESS FOR PREPARING PHENOXYALKYL BROMIDE

Leo S. Luskin, Philadelphia, Pa., assignor to Rohm & Haas Company, Philadelphia, Pa., a corporation of Delaware No Drawing. Application June 25, 1949, Serial No. 101,477

5 Claims. (Cl. 260—612)

This invention concerns a method for preparing phenoxy-alkyl bromides including bromides in which there are attached to the aromatic nucleus small, unreactive substituents such as methyl or ethyl or nitro groups or chlorine.

When a simple alcohol is heated with concentrated aqueous hydrobromic acid, some conversion to the corresponding bromide occurs. The reaction is not, however, complete and steps must be taken to obtain a favorable conversion of alcohol to bromide. A common expedient is addition of sulfuric acid. Alcohols have also been reacted with concentrated hydrobromic acid under pressure.

When the methods of the art are applied to the conversion of phenoxyethanol to phenoxyethyl bromide, it is found that the starting material is largely cleaved at the ether linkage and ethylene bromide is obtained. It will be recognized that the heating of ethers with hydrobromic acid is a useful method for decomposing ethers.

I have found a method whereby relatively good yields of phenoxyethyl bromide or phenoxypropyl bromide are obtained from the reaction of phenoxyethanol or phenoxypropanol and aqueous hydrobromic acid without excessive splitting at the ether linkage. A phenoxyethanol or phenoxypropanol having a neutral inert substituent of no greater weight than the nitro group, 46, is heated with 45% to 50% aqueous hydrobromic acid, in molar excess, and water (or aqueous acid) is distilled from the reaction mixture at a rate of 0.3 to 1.5 moles of water per hour per mole of the initial phenoxy alkanol. An excess of acid of about 18% to 50% is necessary for best results in terms of yield and purity of product. The temperature of distillation is kept as low as possible and is carried from about 100° C. at the start to about 125° C. (vapor temperatures). When approximately the latter temperature is reached, heating is discontinued, acidic substances are neutralized with a base, and the product is purified by distillation and/or crystallization.

The optimum rate for removal of water varies slightly with the particular apparatus used and the size of the batch. For the best results large batches require a relatively slower rate of distillation than small batches, but the rate in any case is within the limits shown above. More rapid removal of water than specified results in large losses of hydrogen bromide, increased splitting of starting material, and products of low purity. Too slow a rate of removal of water or heating under reflux causes excessive or even complete splitting at the ether linkage.

The process of this invention will be described with greater particularity in the following illustrative examples.

Example 1.—There were mixed in a reaction vessel, equipped with stirrer, thermometer, short distillation column, and condenser, 138 parts by weight of phenoxyethanol and 200 parts by weight of 48% hydrobromic acid. The mixture was stirred and heated to boiling. Water was slowly taken off through the column and condenser, the heating being controlled to permit removal of water at as low a temperature as practical. At the start water was taken off at 100° C. After 6.5 hours the vapor temperature had reached 122° C. and, since the rate of distillation was becoming slow, heating was discontinued. The distillate consisted of water containing 20 parts of hydrogen bromide and a small amount of an oil, which proved to be mostly ethylene bromide. The residue in the flask was twice washed with 100 parts of a 5% solution of sodium hydroxide. It was then distilled. The fraction taken off at 117°–122° C./11 mm. amounted to 123 parts and was found to correspond in composition to phenoxyethyl bromide of high purity and to form white crystals melting above 27° C.

Repetition of the above process with 46% hydrobromic acid led to the same end result.

Repetition of the above procedural steps but with 180 parts of hydrobromic acid in place of the 200 parts gave a similar yield of product but purity was then 80%. Excess hydrobromic acid is essential in this reaction, amounts up to 500% having been successfully used. Optimum results are obtained within the preferred limits of 18% to 50% excess.

When phenoxyethanol and 48% hydrobromic acid were heated together and water was taken off at a rate above 1.6 moles per hour per mole of phenoxyethanol, large losses of hydrogen bromide resulted. The product, obtained in poor yield, had a purity below 50%.

Example 2.—There were heated and stirred 276 parts of phenoxyethanol and 400 parts of 48% hydrobromic acid. The reaction was carried out in a way similar to that of Example 1, but the rate of removal of water was adjusted to require 18 hours to reach an end temperature of 124° C. There was obtained a 62% yield of 99% pure phenoxyethyl bromide.

Example 3.—The procedures of Examples 1 and 2 were followed with batches consisting of 550 parts of phenoxyethanol and 800 parts of 48% hydrobromic acid. The time of reaction was 24 hours. The yield was 62% of phenoxyethyl bromide of 94% purity.

When the same size batch was reacted in six hours the yield was 48% and the product after distillation was only 88% pure. Refluxing for two hours without removal of water resulted in fission of the phenoxyethanol at the ether linkage.

Example 4.—In the same way as has been described in the above examples, there were reacted 41 parts of phenoxypropanol and 60 parts of 48% hydrobromic acid. Distillation was started at 100° C. and was continued until a temperature of 125° C. was reached, a time of about 1.7 hours being required. The yield was 60% of a colorless oil distilling at 125°–135° C./6 mm. The product was pure phenoxypropyl bromide, $C_6H_5OCH_2CH_2CH_2Br$.

Example 5.—In the same way as in the previous examples, there were reacted 38 parts by weight of o-cresoxyethanol and 50 parts of 49% hydrobromic acid. Distillation was started at about 100° C. and was continued over a period of three hours. About 30 parts of aqueous distillate was obtained up to a temperature of 124° C. The residue was cooled, washed with aqueous 5% sodium hydroxide solution and with water, taken up in benzene, and dried over magnesium sulfate. The benzene was removed by distillation and the residue was fractionally distilled. The main fraction was taken at 131° C./25 mm. It was a colorless oil amounting to 30 parts by weight, consisting of o-methyl phenoxyethyl bromide.

Example 6.—In accordance with the above procedure there were heated together 86 parts of p-chlorphenoxyethanol and 100 parts of 48% hydrobromic acid. During the course of three hours the temperature was advanced from 100° C. to about 125° C. and there was obtained an aqueous distillate in an amount of 58 parts containing three parts of hydrogen bromide. Thus removal was at the rate of about 0.5 moles of water per hour per mole of chlorophenoxyethanol. The residue was washed with 10% sodium hydroxide solution. It was then distilled. At 165°–168° C./20 mm. there was obtained a fraction amounting to 76 parts by weight and consisting of quite pure chlorophenoxyethyl bromide.

Example 7.—In the same way as above 91.5 parts of p-nitrophenoxyethanol and 100 parts of 48% hydrobromic acid were heated together, with removal of aqueous distillate over a 2.5 hour period. The residue solidified. It was recrystallized from ethanol. The yield of the thus purified product was 67 parts of pale yellow needles which corresponded in composition to nitrophenoxyethyl bromide and melted at 68° C. The literature records the identical melting point for p-nitrophenoxyethyl bromide.

Thus, a phenoxyalkanol

in which $n$ is an integer from two to three and R is a neutral substituent of a group weight of not over 46 is converted by reaction with 45% to 50% hydrobromic acid to the corresponding bromide

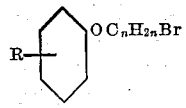

in good yield. The products thus resulting are of good purity. In the above formulae $C_nH_{2n}$ is an alkylene chain of at least two carbon atoms and $n$ has a value of two to three.

I claim:
1. A process for preparing phenoxyalkyl bromides of the formula

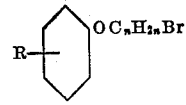

which comprises heating together a phenoxy alkanol of the formula

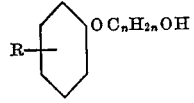

and a molecular excess of 45% to 50% hydrobromic acid and taking therefrom an aqueous distillate at the rate of 0.3 to 1.5 moles of water per hour per mole of initial phenoxyalkanol until a vapor temperature of about 125° C. is reached, $n$ in the above formulae being an integer from two to three, $C_nH_{2n}$ being an alkylene chain of at least two carbon atoms, and R being a member of the class consisting of hydrogen, alkyl groups of not over two carbon atoms, chlorine, and the nitro group.

2. A process for preparing $\beta$-phenoxyethyl bromide which comprises heating together $\beta$-phenoxyethanol and 45% to 50% hydrobromic acid in an 18% to 50% molar excess and removing water from the heated mixture at a rate of 0.3 to 1.5 moles per hour per mole of initial $\beta$-phenoxyethanol until a vapor temperature of about 125° C. is reached.

3. A process for preparing $\beta$-phenoxyethyl bromide which comprises heating together $\beta$-phenoxyethanol and 45% to 50% hydrobromic acid in an 18% to 50% molar excess, removing water from the heated mixture at a rate of 0.3 to 1.5 moles per hour per mole of initial $\beta$-phenoxyethanol until a vapor temperature of about 125° C. is reached, neutralizing any acidic substances in the reaction mixture, and separating $\beta$-phenoxyethyl bromide.

4. A process for preparing p-chlorophenoxyethyl bromide which comprises heating together p-chlorophenoxyethanol and 45% to 50% hydrobromic acid in an 18% to 50% molar excess, distilling water from the heated mixture at a rate of 0.3 to 1.5 moles per hour per mole of initial p-chlorophenoxyethanol until a vapor temperature of about 125° C. is reached, neutralizing any acidic substances in the reaction mixture, and separating p-chlorophenoxyethyl bromide.

5. A process for preparing p-nitrophenoxyethyl bromide which comprises heating together p-nitrophenoxyethanol and 45% to 50% hydrobromic acid in an 18% to 50% molar excess, distilling water from the heated mixture at a rate of 0.3 to 1.5 moles per hour per mole of initial p-nitrophenoxyethanol until a vapor temperature of about 125° C. is reached, neutralizing any acidic substances in the reaction mixture, and separating p-nitrophenoxyethyl bromide.

LEO S. LUSKIN.

REFERENCES CITED

The following references are of record in the file of this patent:

UNITED STATES PATENTS

| Number | Name | Date |
| --- | --- | --- |
| 2,094,489 | Hueter | Sept. 28, 1937 |
| 2,124,605 | Bousquet | July 26, 1938 |